United States Patent [19]

Schefbauer

[11] 4,250,066
[45] Feb. 10, 1981

[54] MODIFIED PHENOLIC RESINATES AND INKS

[75] Inventor: Rupert J. Schefbauer, Hasbrouck Heights, N.J.

[73] Assignee: Inmont Corporation, New York, N.Y.

[21] Appl. No.: 110,269

[22] Filed: Jan. 7, 1980

[51] Int. Cl.³ .............................................. C08L 93/04
[52] U.S. Cl. ................................ 260/25; 260/27 BB; 525/138; 525/143
[58] Field of Search ................. 260/25, 27 R, 27 BB; 525/138, 143

[56] References Cited

U.S. PATENT DOCUMENTS

| | | | |
|---|---|---|---|
| 2,647,094 | 7/1953 | Hahn | 525/143 |
| 3,036,029 | 5/1962 | Chapin | 525/143 |
| 3,211,804 | 10/1965 | Baum et al. | 525/143 |
| 3,674,732 | 7/1972 | Pitzalis et al. | 260/25 |
| 3,880,788 | 4/1975 | Rudolphy | 260/27 BB |
| 3,935,145 | 1/1976 | Rudolphy | 260/27 BB |
| 3,950,286 | 4/1976 | Hoenel et al. | 260/25 |

*Primary Examiner*—H. S. Cockeram
*Attorney, Agent, or Firm*—Michael R. Chipaloski; F. W. Wyman

[57] ABSTRACT

Improved limed resinates are disclosed. The calcium resinates comprise the reaction product of calcium hydroxide with:

(a) a rosin modified phenol formaldehyde condensate and (b) an α-olefin-maleic anhydride partial ester or polyanhydride.

Printing inks containing the improved limed resinates are also disclosed.

10 Claims, No Drawings

MODIFIED PHENOLIC RESINATES AND INKS

The present invention relates to printing inks containing a hydrocarbon solution of a limed resinous binder wherein said binder comprises the reaction product of calcium hydroxide with (a) a rosin modified phenol formaldehyde condensate and (b) an α-olefin-maleic anhydride partial ester or polyanhydride.

Limed rosin is widely used in inks, coatings, etc., and is prepared by the fusion method or the solution method. The solution method is very desirable when the limed resinate can be made in a solvent that is useful in the ink or coating that is to be prepared. In coatings and inks using hydrocarbons as solvent, it is necessary that the limed rosin be soluble in the commonly used hydrocarbon solvent. In the past it has been impossible to prepare limed rosins, especially limed tall oil rosin, or mixtures of rosin which include tall oil rosin, that are soluble in hydrocarbons when the degree of liming is more than about two-thirds of the amount of lime required to form the di-resinate. Rosin consists predominantly of resinous monocarboxylic acids with only a minor amount of non-acidic material. Tall oil rosin differs from wood and gum rosins in that it contains 2–3% of fatty acids. The rosin acids are monocarboxylic acids of alkyl hydrophenanthrene, e.g. abietic acid. In the liming process the monocarboxylic acids of rosin react with calcium hydroxide to form calcium salts, or resinates. Theoretically, the resinous acids can react to form either calcium di-resinate or basic calcium mono-resinate, i.e., $Ca(resinate)_2$ or $Ca(OH)(resinate)$. The calcium di-resinate contains approximately 6.2% calcium while the basic calcium monoresinate contains 11.2% calcium. In accordance with prior art processes, it is not possible to incorporate more than about 6 to 7 parts of calcium hydroxide per 100 parts of rosin in a solution liming of rosin, especially tall oil rosin. Assuming complete conversion of lime of di-resinate, this would give a product containing 3.06 to 3.56 calcium. As the percentage of calcium increases, the melting point of the resinate increases, and this is important in the printing ink field, and results in it being desirable to increase the degree of liming in order to obtain the more desirable higher melting resinates. Therefore, there is a need and a desire in the industry to have a solution method for making high melting calcium resinates that are soluble in hydrocarbon solvents commonly used in printing inks and coatings.

In co-pending application Ser. No. 947,146 filed Sept. 29, 1978 pending entitled *Calcium Resinates and Inks,* limed resinates and printing inks containing the limed resinates are disclosed. The application describes the preparation of a rosin preferably limed in solution in a hydrocarbon solvent in the presence of a polymeric polycarboxylic acid wherein the polymeric polycarboxylic acid is a partial ester of a 1.3:1 molar ratio copolymer of maleic anhydride and α-olefin.

Also, in co-pending application Ser. No. 065,651, filed Aug. 10, 1979, novel calcium resinates are described that comprise the reaction product of calcium hydroxide and rosins with (a) a reactive hydrocarbon resin, and (b) a polyanhydride of an α-olefin-maleic anhydride.

Printing inks containing the improved limed resinates are also disclosed.

We have now found that these α-olefin-maleic anhydride partial esters and polyanhydride described in the aforementioned co-pending applications, can be reacted with lime in the presence of a rosin modified phenol formaldehyde condensate and the resulting limed resinates have been found to exhibit superior properties for use as a binder in printing ink formulations. Inks produced with this binder exhibit gloss improvement as well as higher viscosity characteristics.

SUMMARY OF THE INVENTION

The present invention provides for an improved limed resinate. In accordance with the invention, (a) a rosin modified phenol formaldehyde condensate, and (b) an α-olefin-maleic anhydride partial ester or polyanhydride are reacted with calcium hydroxide to form the improved limed resinate.

The invention also provides a printing ink consisting of a pigment dispersed in a hydrocarbon solution of a limed resinous binder wherein said binder comprises the reaction product of calcium hydroxide with (a) a rosin modified phenol formaldehyde condensate, and (b) an α-olefin-maleic anhydride partial ester or polyanhydride.

DETAILED DESCRIPTION OF THE INVENTION

In accordance with this invention, improved limed resinates are obtained by carrying out a liming reaction in the presence of (a) a rosin modified phenol formaldehyde condensate, and (b) an α-olefin-maleic anhydride partial ester or polyanhydride.

The resulting resinate solutions, when used in printing inks, especially gravure printing inks, produce inks having improved properties such as greater solubility of the resin in solvent. This improved solubility results in an ink having higher concentration of resin in the printing ink composition. The inks provide prints having improved film properties. The major improvements in film properties are improvement in gloss and higher viscosity characteristics, adhesion of the ink to the substrate, toughness of the ink film and the ink film has better abrasion resistance. I have found that the resinate solutions have viscosities between 8,000–10,000 cps. This range is substantially higher than any known in the art and results in an ink formulation having greatly improved properties.

The invention also provides for a printing ink consisting of a pigment dispersed in a vehicle consisting of a hydrocarbon solution of a limed resinous binder wherein said binder comprises the reaction product of calcium hydroxide with (a) a rosin modified phenol formaldehyde condensate and (b) an α-olefin-maleic anhydride partial ester or polyanhydride.

The use of α-olefin of 18 or more carbon atoms favors the formation of the polyanhydride. The use of longer chain α-olefins favors the formation of the anhydride copolymer with maleic anhydride, without esterification, in the liming reaction and is described in detail in copending U.S. patent application Ser. No. 065,651 pending. In co-pending application Ser. No. 846,749 now abandoned it was found that the use of lower α-olefins (up to 18 carbon atoms) without esterification resulted in an insoluble product being formed. The application describes the utility of these lower α-olefins with partial esterification in ink binder formulations (the partial esters).

Pure α-olefins containing at least 18 carbon atoms in the chain such as octadecene, etc., can be used, but grades or mixtures containing two or more of the olefins are preferred for polyanhydride formation. Suitable mixtures are obtainable, for instance, from Chevron Chemical Co., Gulf Oil Chemical Co., Ethyl Corp. and Shell Chemical Co. These products are represented to contain more than 75% of the n-alpha olefins and no more than 9% of saturated hydrocarbons. Typical analysis of commercial grades of α-olefins that are operable in the invention are:

Gulf Alpha Olefin Fractions (Available from Gulf Oil Chemical Company)

Gulf Octadecene-1 ($C_{18}$), 90.8% n-alpha olefin, 98.6% mono-olefins, 1.4% saturated hydrocarbons, 98% $C_{18}$ hydrocarbon.

Gulf Alpha Olefin Fraction $C_{20}$–$C_{24}$, 1% $C_{18}$ hydrocarbon, 49% $C_{20}$ hydrocarbon, 42% $C_{22}$ hydrocarbon, 8% $C_{24}$ hydrocarbon, less than 0.1% of $C_{26}$ hydrocarbon.

Gulf Alpha Olefin Fraction $C_{24}$–$C_{28}$, 0.3% $C_{22}$ hydrocarbon, 28% $C_{24}$ hydrocarbon, 44% $C_{26}$ hydrocarbon, 20% $C_{28}$ hydrocarbon, 8% $C_{30}$ hydrocarbon.

Gulf Alpha Olefin Fraction $C_{22}$–$C_{24}$, 1.8% $C_{20}$ hydrocarbon, 69.8% $C_{22}$ hydrocarbon, 28.4% $C_{24}$ hydrocarbon.

Chevron Alpha Olefins (Available from Chevron Chemical Co., Industrial Chemicals Division)

$C_{18}$–$C_{20}$ Fraction: 8.9% paraffin hydrocarbon, 3.6% diolefin hydrocarbon, 86.3% n-alpha olefin, 1.4% $C_{17}$ hydrocarbon, 22.6% $C_{18}$ hydrocarbon, 37% $C_{19}$ hydrocarbon, 30% $C_{20}$ hydrocarbon, 9% $C_{21}$ hydrocarbon.

Shell Alpha Olefins (Available from Shell Chemical Company)

$C_{14}$ Fraction: $C_{12}$ and lower hydrocarbon less than 1%, 99% $C_{14}$ hydrocarbon, 1% of $C_{16}$ hydrocarbon and higher.

$C_{16}$ Fraction: 5% $C_{14}$ hydrocarbon and lower, 93% $C_{16}$ hydrocarbon, 2% $C_{18}$ hydrocarbon and higher.

$C_{18}$ hydrocarbon: 1% $C_{16}$ hydrocarbon and lower, 92% $C_{18}$ hydrocarbon, 7% $C_{20}$ hydrocarbon and higher.

A 1.3:1 molar ratio of a maleic anhydride and α-olefin is preferable and will vary on a weight equivalent basis with the carbon chain length of the 60-olefin. The polyanhydride is preferably used in the range of 8–30% by weight of total resins in the liming reaction.

Preferably a mixture of rosins are used in the preparation of the modified phenol formaldehyde condensate (Component A) used in preparing the instant limed resinates having improved film properties. The particular mixture used is determined by the particular circumstances existing at the time, such as availability, price, and color of the different rosins, and the particular ink application involved. The choice of the particular mixture to use at a particular time is within the skill of the ink formulator.

Gravure printing inks, especially inks used for publication printing, contain limed rosins of various types as the resin component. Mixtures of light, dark and polymerization types are generally used. However, light rosins, whether gum or tall oil types, do not usually produce clear, homogeneous, products when limed. Also, the limed products do not contribute to increasing the viscosity of the ink vehicle as desired and thus do not promote solvent reduction of the inks to printing viscosity.

Suitable phenolic components useful in the phenol formaldehyde condensate formation include, for example, mono- or polyfunctional, mono- or polynucleic phenols and/or the alkyl substitution products thereof having 1 to 9 carbon atoms in the alkyl radical, such as phenol, resorcinol, diphenlolpropane, preferably alkyl phenols, such as cresol, butyl phenols, amyl phenols, octyl phenols, nonyl phenols, or mixtures thereof. The formaldehyde may be present as such, or in the form of paraformaldehyde or trioxan, or a mixture thereof. In the case of higher proportions of phenol, e.g. at least 10%, the formaldehyde will generally be present in substantially equimolar quantities with respect to phenol.

Advantageously, the liming reaction is carried out in a hydrocarbon solvent that is useful in printing inks and coatings, such as Lactol Spirits, Rotosolve, Magie Oil, toluene, xylene, etc. If the resinate is to be used in gravure ink, Lactol Spirits, Rotosolve or toluene are preferred solvents. The reaction is carried out by adding lime, or preferably a mixture of lime and urea, to a solution of the Components A and B at a temperature below about 125° F. and then, after an initial exotherm, heating the mixture at higher temperatures, up to the reflux temperature, until the liming reaction is complete, e.g., until the theoretical amount of water has been driven off, or until no more water can be driven off, or until a clear solution is obtained. The resulting resinate solution is then used in printing inks and coatings.

Limed resinate prepared in accordance with the invention can be used to replace all of limed rosin used in conventional inks. Advantageously, the limed resinate of the present invention is made using mixtures of tall oil rosin with one or more other types of resins, such as wood rosin, gum rosin, polymerized rosin, etc. In the preferred embodiment of the invention, 25% or more, by weight, of the rosin reactant may consist of non-tall oil rosin. Part of the tall oil rosin may consist of a commercial grade of tall oil, i.e., a liquid product containing substantial amounts of fatty acids, e.g., Unitol R, which is a tall oil composed of 52.3% fatty acids, 40.5% tall oil rosin acids, and 7.2% unsaponifiables. Preferably such tall oil products should constitute no more than 10 or 15% by weight of the total rosin reactant. Another relatively inexpensive rosin material that may be included in small amounts, i.e., no more than 10 to 15% of the total rosin reactant, is a still bottoms rosin residue resulting from the polymerization and distillation of rosin, e.g., Melhi.

In addition, the reactive hydrocarbon resin described in co-pending application Ser. No. 065,651, filed Aug. 10, 1979, may be used in small amounts (about 1 to 25%) of the total resins in the liming reaction. Preferred hydrocarbon resins of this type include Nevroz 1520, which is commercially available from Neville Chemical Company, and Zecoroz 750, available from Ziegler Chemical and Mineral Corporation.

Inks prepared in accordance with the invention contain pigment or pigments dispersed in the limed resinate solution. The inks may contain other conventional ink ingredients in minor amounts without departing from the invention. For instance, ethyl cellulose, wax compounds, pigment wetting agents, etc., may be added for their known effects. The major improvements over conventional inks are improvement in gloss, adhesion of the ink to the substrate, toughness of ink film and the ink film has better abrasion resistance.

The invention will next be illustrated in terms of specific examples. In these examples, as well as in the other parts of the present application, all amounts and proportions are expressed on a weight basis unless otherwise indicated.

EXAMPLE 1

Preparation of Rosin Modified Phenolic Condensate

| Parts | |
|---|---|
| 18.10 | Gum Rosin |
| 18.10 | Tall Oil Rosin |
| 4.78 | Nonyl Phenol |
| 4.65 | Phenol |
| | Melt at 110° C. under a nitrogen inert blanket and add with agitation |
| 4.90 | Paraformaldehyde |
| 2.23 | Zinc Acetate |
| | The above mixture was held for 2 hours at reflux formed by the condensate water. The temperature was raised to 150°–155° C. while gradually distilling off the water of condensation. The temperature was reduced to 50° and the following added: |
| 43.64 | Lactol Spirits |
| 2.60 | Hydrated Lime |
| 1.00 | Urea |
| 100.00 | The temperature was gradually raised to 113°–116° removing water by azeotrope. The reaction was held at reflux for two hours. |
| % solids | 56% |
| A.N. | 30 |
| M.P. | 157°–160° |

EXAMPLE 2

In a second experiment gum rosin was eliminated and 36.8 tall oil rosin was used. Paraformaldehyde was replaced with 7.6 of 37% formaldehyde.

| % solids | 56% |
|---|---|
| A.N. | 31 |
| M.P. | 160°–163° C. |

EXAMPLE 3

The procedure of Example 1 was followed and a rosin modified phenolic was prepared from:

| Parts | |
|---|---|
| 46.10 | Tall Oil Rosin |
| 13.74 | p-Tertiary Butyl Phenol |
| 6.28 | Paraformaldehyde |
| 2.88 | Zinc Acetate |
| 31.00 | Toluene |
| 100.00 | | and had the following properties:

| % Solids | 71% |
|---|---|
| A.N. | 79.8 |
| M.P. | 89°–91° C. |

EXAMPLE 4

This formula demonstrates a dual phenol and dual solvent formulation and processing similar to Example 1. It is compared with another example using a single phenol and single solvent.

| 33.0 | Tall Oil Rosin | 35.2 |
|---|---|---|
| 3.6 | p-Tertiary Butyl Phenol | 10.5 |
| 4.9 | Nonyl Phenol | — |
| 3.2 | Paraformaldehyde | 4.8 |
| 1.5 | Zinc Acetate | 2.2 |
| 42.0 | Rotosolve | — |
| 8.4 | Toluene | 44.1 |
| 2.4 | Hydrated Lime | 2.4 |
| 1.0 | Urea | 0.8 |
| 100.0 | | 100.0 |
| % Solids | 49% | 56% |
| A.N. | 26 | 43 |
| M.P. | 178°–180° C. | 174°–177° C. |

EXAMPLE 5

Preparation of α-Olefin-Maleic Anhydride Polyanhydride 11.00 parts of maleic anhydride (0.13 moles) and 25.66 parts of $C_{20}$–$C_{24}$ alpha olefin (0.10 moles) were copolymerized in 27.52 parts of toluene using 1.03 parts of p-tertiary butyl perbenzoate and heating at 125° C. for 4 to 5 hours. This polyanhydride is referred to below as Polyanhydride I.

EXAMPLE 6

Preparation of Partial Ester of α-Olefin-Maleic Anhydride Copolymer 13.14 parts of maleic anhydride (0.13 moles) and 23.52 parts of $C_{15}$–$C_{18}$ alpha olefin (0.10 moles) were copolymerized in 27.52 parts of toluene using 1.03 parts of p-tertiary butyl perbenzoate and heating at 125° C. for 4 to 5 hours. The resulting copolymer solution was reacted with 8.26 parts of isopropanol (0.137 moles) and 8.94 parts of 2-ethyl hexanol (0.069 moles) using 0.17 parts of p-toluene sulfonic acid as esterification catalyst and heating at 140° C. until the acid number was 138 (solids basis). Dilution to 45% solids with 17.2 parts of methyl ethyl ketone yielded a clear solution of acid number 62, and carboxyl equivalent weight of 900. This solution is referred to below as Partial Ester Solution I.

EXAMPLE 7

A limed rosin solution was prepared from:

| | Parts |
|---|---|
| Toluene | 30.70 |
| Tall Oil Rosin | 1.85 |
| Polyanhydride I | 6.20 |
| Phenolic Intermediate Ex. 3 | 57.44 |
| Hydrated Lime | 3.04 |
| Urea | .77 |
| | 100.00 |
| % Solids | 49% |
| A.N. | 23.7 |
| M.P. Capillary | 188°–191° C. |

EXAMPLE 8

Rosin Modified Phenolic Intermediate

| | |
|---|---|
| Tall Oil Rosin | 38.7 |
| p-Tertiary Butyl Phenol | 5.8 |
| Nonyl Phenol | 7.9 |
| Paraformaldehyde | 5.2 |
| Zinc Acetate | 2.4 |
| Lactol Spirits | 40.0 |
| | 100.0 |
| % Solids | 60.1 |
| A.N. | 63.3 |
| M.P. | 85°–88° C. |
| Equiv. Wgt. | 886 |

The procedure of Example 1 was followed to form this intermediate.

EXAMPLE 9

Partial Ester of α-Olefin-Maleic Anhydride 13.14 parts of maleic anhydride (0.13 moles) and 23.52 parts of $C_{15}$–$C_{18}$ α-olefin (0.10 moles) were copolymerized in 27.52 parts of toluene using 1.03 parts of p-tertiary butyl perbenzoate and polymer solution was reacted with 3.91 parts of isopropanol (0.065 moles) and 8.45 parts of 2 ethyl hexanol (0.065 moles) by heating at 140° C. until the acid number was 138 (solids basis). Sufficient Melhi and toluene were added to raise the solids to 60% and promote a ratio of partial ester to Melhi of 70/30. A clear solution was received of acid number 87.9 and a carboxyl equivalent weight of 638. This solution is referred to below as Partial Ester Solution II.

EXAMPLE 10

A limed rosin solution was prepared from

| | Parts | No. of Equivalents |
|---|---|---|
| Partial Ester Solution II | 36.0 | .0564 |
| Phenolic Intermediate Ex. 8 | 142.0 | .1603 |
| Hydrated Lime | 6.6 | .1784 |
| Urea | 1.4 | |
| Lactol Spirits | 90.0 | |
| | 276.0 | | by adding urea and hydrated lime to the other ingredients at 120° F., and, after the initial exotherm, removing water of reaction by azeotropic distillation until an acid number of 18 was obtained. The resulting solution was clear, had a viscosity of 2800 cps. at 90° F. and contained 40.3% solids. The capillary melt point of the 100% solid resin was 177°–179° C. Calculated from the corresponding equivalent the amount of lime is about 82% of the amount required to form the di-resinate.

A blue printing ink was prepared by ball milling.

| | |
|---|---|
| 25.0 parts | limed polymer modified phenolic (above) |
| 5.0 parts | phthalocyanine blue pigment |
| 3.3 parts | iron blue pigment |
| 3.0 parts | clay |
| .3 parts | wetting agent |
| 8.0 parts | lacatol spirits (boiling range 200°–223° F.) |
| and then reducing the dispersion with | |
| 45.0 parts | limed polymer modified phenolic (above) |
| 6.5 parts | wax compound (25% polyethylene powder) |
| 3.9 parts | lactol spirits (boiling range 200°–223° F.) |
| 100.0 | |

The above ink reduced well with solvent to printing viscosity. Films applied to coated paper by K coater using a #3 rod result in excellent gloss, scuff resistance, scratch resistance and rub resistance.

EXAMPLE 11

Phenolic Intermediate Preparation

| | Parts |
|---|---|
| Tall Oil Rosin | 78.27 |
| Nonyl Phenol | 14.83 |
| Paraformaldehyde | 4.74 |
| Zinc Acetate | 2.16 |
| | 100.00 |

The procedure of Example 1 was followed to form this product. The cast product had a capillary melt point of 91°–94° F., an acid number of 136 with a calculated equivalent weight of 412.5.

EXAMPLE 12

A limed rosin solution was prepared from

| | |
|---|---|
| Phenolic Intermediate Ex. 11 | 42.4 |
| Partial Ester Solution II | 4.7 |
| Toluene | 14.7 |
| Hydrated Lime | 3.5 |
| Urea | .5 |
| Gulf Oil 896 | 29.2 |
| Tri decanol | 5.0 |
| | 100.0 | by adding lime calculated from the other equivalents at about 85% and urea to the first three ingredients at 120° F., and after the initial exotherm, removing the water of reaction by azeotropic distillation, until the theoretical amount of water was removed. The toluene is then distilled off and replaced with a mixture of Gulf Oil 896 (B.P. 530° F.) and Tridecyl alcohol. This varnish had a viscosity as recorded on the Brookfield viscomoter of 32,000 cps.

EXAMPLE 13

A limed rosin solution was prepared from

| | Parts |
|---|---|
| Rotosolve | 25.2 |
| Toluene | 6.3 |
| Phenolic Intermediate Ex. 12 | 32.6 |
| Reactive Hydrocarbon Resin | 16.0 |
| Partial Ester Solution II | 13.0 |
| Hydrated Lime | 3.1 |
| Urea | .8 |
| Rotosolve | 3.0 |
| | 100.0 | and processed as in Example 11 with the resultant properties:

| | |
|---|---|
| Solids | 59.8% |
| A.N. | 18.7 |
| M.P. | 152°–154° C. |

I claim:

1. A calcium resinate comprising the reaction product of calcium hydroxide with:
   (a) a rosin modified phenol formaldehyde condensate and
   (b) an α-olefin-maleic anhydride partial ester or polyanhydride.

2. The calcium resinate of claim 1 wherein the rosin is selected from the group consisting of tall oil, wood, gum and polymerized rosin.

3. The calcium resinate of claim 1 wherein the partial ester comprises an α-olefin having less than 18 carbon atoms.

4. The calcium resinate of claim 1 wherein the polyanhydride comprises an α-olefin having greater than 18 carbon atoms.

5. The calcium resinate of claim 1 which additionally contains a reactive hydrocarbon resin.

6. A printing ink comprising a pigment dispersed in a varnish comprised of a solution of calcium resinate in hydrocarbon solvent wherein said calcium resinate comprises the reaction product of calcium hydroxide with
   (a) a rosin modified phenol formaldehyde condensate and
   (b) an α-olefin-maleic anhydride partial ester or polyanhydride.

7. The printing ink of claim 6 wherein the rosin is selected from the group consisting of tall oil, wood, gum and polymerized rosin.

8. The printing ink of claim 6 wherein the partial ester comprises an α-olefin having less than 18 carbon atoms.

9. The printing ink of claim 6 wherein the polyanhydride comprises an α-olefin having greater than 18 carbon atoms.

10. The printing ink of claim 6 wherein said calcium resinate additionally contains a reactive hydrocarbon resin.

* * * * *